United States Patent [19]

McCurry

[11] Patent Number: 5,310,296

[45] Date of Patent: May 10, 1994

[54] PLUNGE ROUTER WITH AN ELASTICALLY MOUNTED BUSHING

[75] Inventor: Ronald C. McCurry, West Union, S.C.

[73] Assignee: Ryobi Motor Products, Easley, S.C.

[21] Appl. No.: 63,494

[22] Filed: May 18, 1993

[51] Int. Cl.$^5$ .............. B23C 1/20; B27C 5/00
[52] U.S. Cl. ................. 409/182; 144/134.0; 144/136 C; 408/112
[58] Field of Search ............ 409/182, 181, 178, 175; 144/136 C, 134 D; 51/170 R; 408/129, 136, 112

[56] References Cited

U.S. PATENT DOCUMENTS

| | | | |
|---|---|---|---|
| 1,581,719 | 4/1926 | Carter | 409/182 X |
| 4,445,811 | 5/1984 | Sanders | 409/182 |
| 4,770,573 | 9/1988 | Monobe | 409/182 |
| 4,938,264 | 7/1990 | Ferenczffy | 144/134 D |

FOREIGN PATENT DOCUMENTS

| | | | |
|---|---|---|---|
| 501050 | 3/1954 | Canada | 144/136 C |
| 1220405 | 5/1960 | France | 144/136 C |

OTHER PUBLICATIONS

"Routers", Wood Magazine, Nov. 1992, pp. 72-73.

*Primary Examiner*—William Briggs
*Attorney, Agent, or Firm*—Brooks & Kushman

[57] ABSTRACT

A plunge router (10) is disclosed which has a base (12), a pair of laterally spaced apart columns (14, 16) and a motor housing assembly (18). The base (12) has a planar work engaging surface (22). Affixed to the base (12) are the laterally spaced columns (14,16) which extend perpendicular to the work engaging surface (22). The motor housing assembly (18) has a housing (24), preferably plastic, which supports a pair of bushings (46,48) which slide upon the columns (14,16) to permit the motor housing assembly (18) to move relative to the base (12). One of the bushings (46) is relatively securely held by the housing (24) while the other bushing (48) is elastically mounted relative to the housing (24) to enable limited movement of the bushing (48) relative to the housing (24). This mounting prevents binding between the bushings (46,48) and the columns (14,16) and accommodates production tolerances and variations and thermal expansions and contractions of the housing (24), the base (12) and columns (14,16). Preferably, the plunge router (10) includes an annular elastomeric member (78,80) interposed between the elastically mounted bushing (48) and the housing (24) to accommodate limited radial movement of the housing (24) relative to the bushing (48).

12 Claims, 1 Drawing Sheet

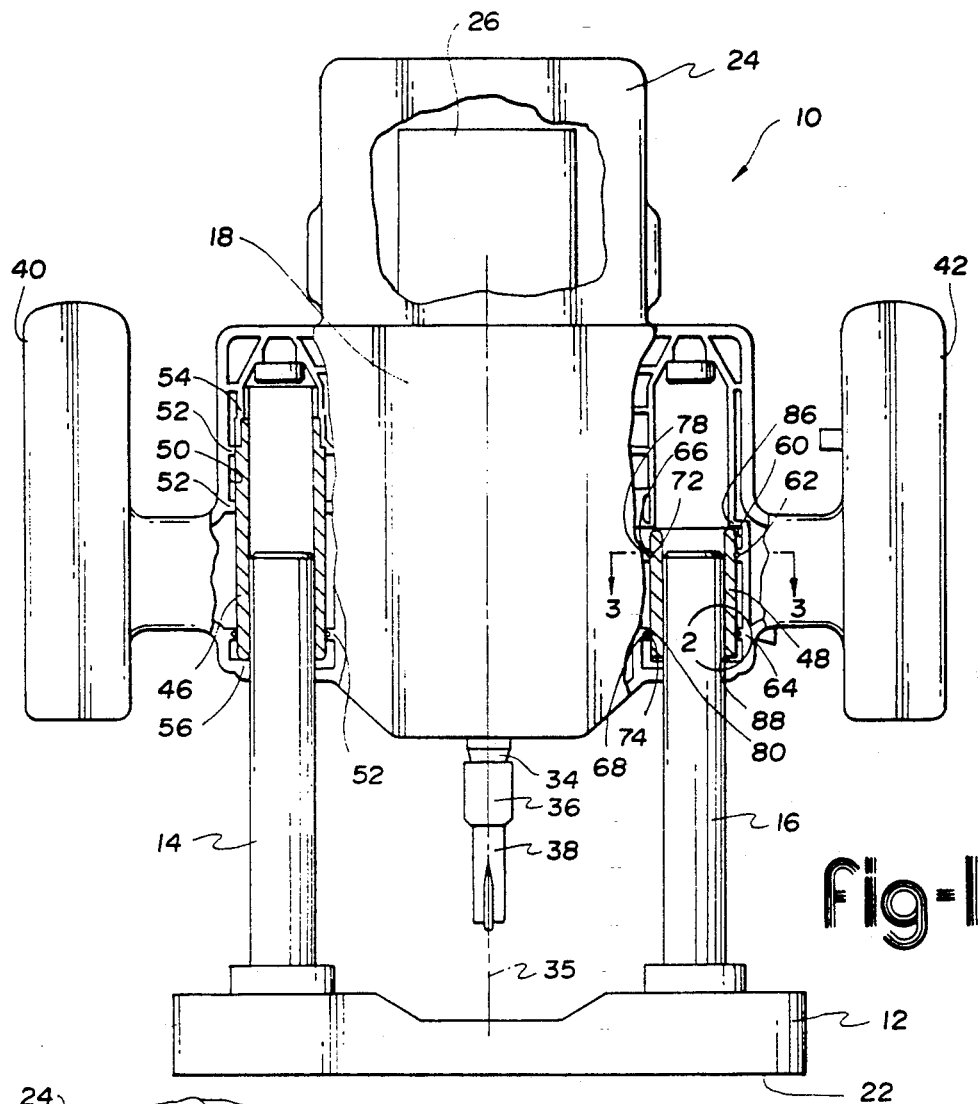
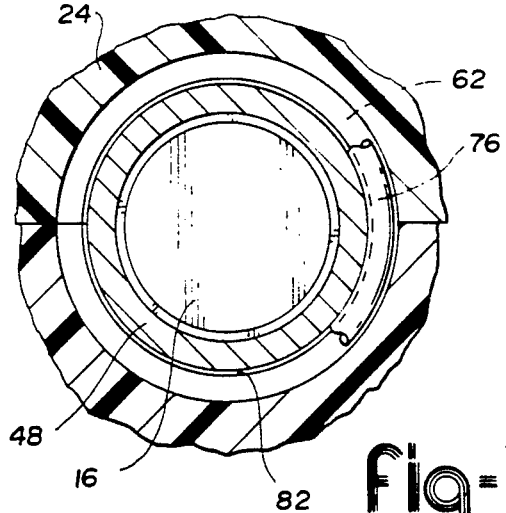
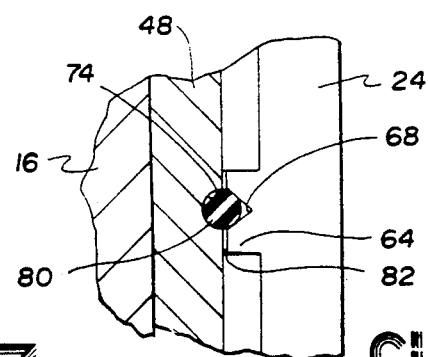

PLUNGE ROUTER WITH AN ELASTICALLY MOUNTED BUSHING

TECHNICAL FIELD

The present invention relates to plunge routers generally, and more particularly, to mounting assemblies used to mount motor housing assemblies upon columns secured to workpiece engaging bases of plunge routers.

BACKGROUND OF THE INVENTION

A conventional plunge router generally has a motor housing assembly translatably mounted upon a pair of laterally spaced columns which are affixed to an annular base. The annular base has a planar work engaging surface to which the columns are perpendicularly orientated. The motor housing assembly carries a cutting tool and may be moved axially relative to the annular base so that the cutting tool may engage and cut a work surface on a workpiece.

A pair of bushings are typically supported within a housing of the motor housing assembly. The bushings provide lateral support to and slide upon the spaced columns to accommodate translational or axial movement between the motor housing assembly and the annular base.

In order for the cutting tool to accurately cut the workpiece, it is important that the axis of the cutting tool, which is parallel to the columns, be maintained perpendicular to the planar work engaging surface of the base. Therefore, tolerances between the inner diameters of the bushings and the outer diameters of the columns, as well as between the bushings and the housing, must be held fairly closely to maintain the perpendicular relationship between the axis of the cutting tool and the planar work engaging surface of the annular base.

However, providing too tight of tolerances between the bushings supported by the housing and the columns can present problems. First, certain minimum tolerances are needed to accommodate manufacturing considerations such as the dimensional stack-ups of components which are joined together. Second, tolerancing must be provided to accommodate thermal expansion and contraction differences between the annular base, to which the columns are affixed, and the housing, which supports the bushings which, in turn, provide lateral support to the free ends of the columns. If this difference becomes large, then the columns will no longer be held parallel. Consequently, the bushings may bind when sliding upon the columns if there is insufficient tolerancing or spacing between the housing, the bushings and the columns.

Conventionally, both the base and the portion of the housing supporting the bushings are made of the same material so that they will have identical thermal coefficients of expansion. Consequently, the base and the bushing supporting portion of the housing expand or contract nearly identically and the columns remain parallel to one another. Due to strength and weight consideration, die cast aluminum is a preferred material for the base and the portion of the housing supporting the bearings.

However, making the housing entirely or partially out of die cast aluminum is costly and the strength of the aluminum is not needed in the housing. Accordingly, it would be advantageous to make a housing out a cheaper material, such as plastic, while still using a metal or die cast aluminum base.

The present invention is intended to overcome the above-described shortcomings of plunge routers using conventional mounting assemblies to join motor housing assemblies to columns and their bases.

SUMMARY OF THE INVENTION

A plunge router is disclosed which has a base, a pair of laterally spaced apart columns, and a motor housing assembly. The base has a planar work engaging surface. Affixed to the base are the laterally spaced columns which extend perpendicular to the work engaging surface. The motor housing assembly is translatably movable upon the columns relative to the base to move a cutting tool into and out of engagement with a work surface of a workpiece.

The motor housing assembly includes a housing, a drive motor for rotating the cutting tool and a pair of bushings. Affixed to the housing is the drive motor which has an armature shaft rotatable about a central axis which extends perpendicular to the planar work engaging surface. The pair of bushings are supported by the housing and are sized to slidingly engage the columns.

One of the bushings is relatively securely affixed to the housing to ensure that the central axis remains perpendicular to the work engaging surface. The other of the pair of bushings is elastically mounted relative to the housing to enable limited movement of the bushing relative to the housing thereby preventing binding between the bushings and the columns and accommodating production tolerances and variations and thermal expansions and contractions of the housing.

Preferably, the plunge router also includes an annular elastomeric member interposed between the elastically mounted bushing and the housing to accommodate limited radial movement of the housing relative to the bushing axis.

It is an object of the present invention to provide a plunge router which has work engaging base made of one material, preferably die cast aluminum, and a housing made of another material, preferably plastic, so that the overall expense of manufacturing the plunge router can be reduced.

It is another object of the present invention to provide a plunge router wherein one of its bushings is relatively securely affixed to a housing to ensure the central axis of a cutting tool mounted within the plunge router remains perpendicular to the work engaging surface of a base and another bushing is elastically mounted relative to the housing to enable limited movement of that bushing relative to the housing thereby preventing binding between the bushings and the columns, the bushings slide upon and accommodate the production variations and tolerances and thermal expansion and contraction of the housing.

It is another object to provide an annular elastomeric member between a bushing and a housing to elastically mount the bushing within the housing.

BRIEF DESCRIPTION OF THE DRAWINGS

These and other features, aspects, and advantages of the present invention will become better understood with regard to the following description, appended claims, and accompanying drawings where:

FIG. 1 is a side elevational view, partially in cutaway, of a plunge router made in accordance with the present invention;

FIG. 2 is an enlarged fragmentary sectional view of the area encircled in FIG. 1; and FIG. 3 is a cross-sectional view taken along line 3—3 of FIG. 1.

BEST MODE FOR CARRYING OUT THE INVENTION

Turning now to FIG. 1, a plunge router 10 is shown which is made in accordance with the present invention. Plunge router 10 includes a base 12, a pair of elongate columns 14 and 16, and a motor housing assembly 18. Motor housing assembly 18 is shiftably cooperable with columns 14 and 16 and positionable therealong at various fixed positions relative to base 12. For simplicity and clarity, springs biasing motor housing assembly 18 away from base 12 and a locking mechanism for fixedly securing motor housing assembly 18 along columns 14 and 16 are not shown as they are conventional and are not part of the present invention.

Base 12 is an annular ring having a central opening therein. Located on base 12 is a planar work engaging surface 22 which flushly mounts upon a work surface of a workpiece to be routed. Preferably, base 12 is made of metal such as die cast aluminum.

Columns 14 and 16 are affixed to base 12 and extend perpendicular to planar work engaging surface 22. Preferably, columns 14 and 16 are made of steel and have smooth cylindrical outer surfaces.

Motor housing assembly 18 includes plastic housing 24, a drive motor 26 which is affixed to plastic housing 24, and a pair of bushings 28 and 30.

Drive motor 26 has an armature shaft 34 which is rotatable about a central axis 35. Central axis 35 extends perpendicular to work engaging surface 22. Attached to armature shaft 34 is a collet or chuck 36 which releasably secures a cutting tool 38. Armature shaft 34, collet 36 and cutting tool 38 are coaxially aligned along central axis 36 and are maintained perpendicular to work engaging surface 22.

Housing 4 is of a clam shell design having first and second generally cylindrical halves. A parting line between the halves can be seen in FIG. 3. A pair of handles 40 and 42 are formed in housing 24 to enable a user to move motor housing assembly 18 longitudinally along columns 14 and 16 to thereby move cutting tool 38 into and out of engagement with a workpiece.

Secured within housing 24 are a pair of bushings 46 and 48 which are generally cylindrical and surround respective columns 14 and 16. The diametrical clearance between the outer diameter of column 14 and the inner diameter of bushing 46 is tightly maintained so that bushing 46 will move longitudinally along column 14 and perpendicular to work engaging surface 22. Consequently, motor 26, armature shaft 34, and cutting tool 38 will remain parallel to columns 14 and 16 and perpendicular to work engaging surface 22 throughout the travel of motor housing assembly 18 along columns 14 and 16. Further, bushing 46 is elongate and extends a significant distance along column 14 to ensure that bushing 46 and column 14 remain coaxial relative to one another.

Bushing 46 is tightly captured within a cavity 50 of housing 24. Cavity 50 has a plurality of axially spaced and radially inwardly extending flanges 52. Located above and below bushing 46 in cavity 50 are stops 54 and 56 which axially locate bushing 46. Accordingly, bushing 48 is accurately located within housing 24.

As shown in FIGS. 1, 2 and 3, bushing 48 is elastically mounted within a cavity 60 of housing 24 and cooperatively engages column 16. Cavity 60 has a pair of radially inwardly extending annular flanges 62 and 64 which have annular V-shaped notches 66 and 68 which open radially inwardly. Aligned axially with notches 66 and 68 are annular grooves 72 and 74 formed in the outer diameter of bushing 48. Notch 68 and groove 74 are best seen in enlarged FIG. 2.

A pair of annular elastomeric members or O-rings 76 and 78 are cooperatively held between notches 66 and 68 and respective grooves 72 and 74. O-rings 76 and 78 are longitudinally spaced apart to stably position bushing 48 within cavity 60. An annular clearance gap 82 is formed between bushing 48 and flanges 62 and 64, as best seen in FIG. 3.

Stops 86 and 88 are formed within cavity 60 to abut and axially position the longitudinal ends of bushing 48. The clam-shell design of housing 24 allows for stops 86 and 88 to clamp about bushing 48.

Accordingly, bushing 46 is relatively securely affixed to housing 24 to ensure central axis 35 remains perpendicular to work engaging surface 22. Meanwhile, bushing 48 is elastically mounted relative to housing 24 to enable limited movement of bushing 48 relative to housing 24 thereby preventing binding between the bushings and the columns and accommodating the production variation and tolerances and thermal expansion and contraction of housing 24.

For example, columns 14 and 16 are affixed to base 12 perpendicularly to work engaging surface 22. Meanwhile bushings 46 and 48 are secured relative to housing 24 and capture and laterally support the upper free ends of columns 14 and 16. If base 12, which is made of aluminum, and housing 24, which is made of plastic, are subjected to significant changes in temperature, base 12 will expand or contract more than housing 24 due to the aluminum's greater coefficient of thermal expansion. Consequently, fixed ends 15 and 17 of columns 14 and 16 will tend to displace a greater distance than bushings 46 and 48 held in housing 24.

To maintain the parallelism between columns 14 and 16, the relative displacement between bushings 46 and 48 must be the same as between the fixed ends of columns 14 and 16. By elastically mounting bushing 48 within housing, this relative displacement is accommodated. Therefore, the parallelism between columns 14 and 16 is maintained and there will be no binding of bushings 46 and 48 upon columns 14 and 16 as motor housing assembly 18 is moved relative to base 12.

Consequently, housing 12 can be made of a cheaper material than the expensive die cast aluminum from which base 12 is made without there being a detrimental effect on performance of plunge router 10. Further, the design of the present invention also accommodates production tolerances and variations which might otherwise cause lateral dimensional stackup problems between bushings 46 and 48.

While the foregoing specification of this invention has been described in relation to a certain preferred embodiment thereof, and many details have been set forth for purposes of illustration, it will be apparent to those skilled in the art that the invention is susceptible to additional embodiments and that certain of the details described herein can be varied considerably without departing from the basic principles of the invention.

For example, both bushings 46 and 48 could be elastically mounted in the manner described above.

What is claimed is:

1. A plunge router comprising:
   a base having a planar work engaging surface;
   a pair of laterally spaced apart columns affixed to the base and extending perpendicular to the work engaging surface;
   a motor housing assembly translatably cooperating with the columns for movement therealong, the motor housing assembly including:
   a housing;
   a drive motor for rotating a cutting tool, the drive motor affixing to the housing and having an armature shaft rotatable about a central axis which extends perpendicular to the work engaging surface; and
   a pair of bushings supported by the housing and sized to slidingly engage the columns;
   wherein one of the bushings is relatively securely affixed to the housing to ensure the central axis remains perpendicular to the work engaging surface and the other of the pair of bushings is elastically mounted relative to the housing to enable limited movement of the bushing relative to the housing thereby preventing binding between the bushings and the columns and accommodating the production variations and tolerances and thermal expansions and contractions of the housing.

2. The plunge router of claim 1 wherein:
   the housing is plastic and the annular base is made of a metal.

3. The plunge router of claim 1 further comprising:
   an annular elastomeric member interposed between the elastically mounted bushing and the housing to accommodate limited relative radial movement of the housing relative to the bushing axis.

4. The plunge router of claim 3 comprising:
   a second annular elastomeric member, axially spaced from the first member the bushing axis and interposed between the elastically mounted bushing and the housing.

5. The plunge router of claim 1 wherein:
   both bushings are elastically mounted relative to the housing.

6. The plunge router of claim 1 wherein:
   a radial clearance gap exists between the housing and each of the bushings, the clearance gap between the elastically mounted bushing and the housing being greater than the clearance gap between the other bushing and the housing.

7. The plunge router of claim 1 wherein:
   one of the bushings is non-elastically mounted, the non-elastically mounted bushing being longer than the elastically mounted bushing to engage its column over a greater length of the column to maintain the central axis parallel with its column and perpendicular to the work engaging surface.

8. The plunger router of claim 3 wherein:
   the elastomeric member is an O-ring.

9. A plunge router comprising:
   a base having a planar work engaging surface;
   a pair of spaced apart columns affixed to the base and extending perpendicular to the work engaging surface;
   a motor housing assembly shiftably cooperating with the columns and positionable therealong at various fixed positions relative to the work engaging surface, the motor housing assembly including:
   a plastic housing;
   a drive motor affixed to the plastic housing, the drive motor having an armature shaft rotatable about a central axis perpendicular to the work engaging surface for rotating a cutting tool;
   a pair of bushings supported by the housing and sized to slidingly engage the columns wherein one of the bushings is relatively securely affixed to the plastic housing to ensure the motor axis remains perpendicular to the work engaging surface and the other of the pair of bushings being elastically mounted relative to the plastic housing to enable limited movement of the bushing relative to the plastic housing thereby preventing binding and accommodating production tolerances and variations and thermal expansions and contractions of the plastic housing.

10. The plunge router of claim 9 further comprising:
    an annular elastomeric member interposed between the elastic mounted bushing and the plastic housing to accommodate limited radial movement of the plastic housing relative to the bushing axis.

11. The plunge router of claim 10 further comprising:
    a second annular elastomeric member axially spaced apart from the first annular elastic member and interposed between the elastic mounted bushing and the plastic housing to accommodate limited radial movement of the plastic housing relative to the bushing axis, the elastomeric members cooperating to keep the bushing generally coaxially aligned with their corresponding column.

12. The plunge router of claim 10 wherein:
    the elastomeric member is an O-ring.

* * * * *